(12) United States Patent
Avenell

(10) Patent No.: US 7,658,337 B2
(45) Date of Patent: Feb. 9, 2010

(54) FLUID VECTORING NOZZLE

(75) Inventor: Christopher Stuart Avenell, Torquay (GB)

(73) Assignee: Rolls-Royce PLC, London (GB)

( * ) Notice: Subject to any disclaimer, the term of this patent is extended or adjusted under 35 U.S.C. 154(b) by 541 days.

(21) Appl. No.: 11/354,879

(22) Filed: Feb. 16, 2006

(65) Prior Publication Data

US 2006/0186264 A1    Aug. 24, 2006

(30) Foreign Application Priority Data

Feb. 24, 2005  (GB) ................... 0503874.0
Jan. 12, 2006  (GB) ................... 0600639.9

(51) Int. Cl.
*B63H 25/46* (2006.01)

(52) U.S. Cl. .................... 239/265.17; 60/231
(58) Field of Classification Search .................. 60/204, 60/231; 239/265.17, 265.23
See application file for complete search history.

(56) References Cited

U.S. PATENT DOCUMENTS

| 3,374,954 | A | * | 3/1968 | Card ................. 239/127.1 |
| 5,205,119 | A | | 4/1993 | Bulman |
| 5,833,139 | A | * | 11/1998 | Sondee et al. ........ 239/265.17 |
| 6,298,658 | B1 | | 10/2001 | Bak |
| 6,679,048 | B1 | | 1/2004 | Lee et al. |

FOREIGN PATENT DOCUMENTS

| GB | 691948  | 5/1953  |
| GB | 754173  | 8/1956  |
| GB | 770025  | 3/1957  |
| GB | 823658  | 11/1959 |
| GB | 1028465 | 5/1966  |
| GB | 1134835 | 11/1968 |

* cited by examiner

*Primary Examiner*—Michael Cuff
*Assistant Examiner*—Vikansha S Dwivedi
(74) *Attorney, Agent, or Firm*—Oliff & Berridge, PLC

(57) ABSTRACT

A fluid vectoring nozzle comprises flow vectoring means suitable for selectively producing a fluid dynamic throat in the nozzle in a plane oblique to the axis of the nozzle, such that in operation fluid flow passing through the throat is rotated about an axis parallel to and coincident with the plane of the throat. That is to say, the present invention comprises flow vectoring means suitable for selectively producing a fluid dynamic throat in the nozzle in a plane oblique to the axis of the nozzle, such that, in operation, fluid passing through the fluid dynamic throat is turned towards an angle perpendicular to the plane of the throat. Fluid injection means are provided to inject a control fluid into the nozzle through a perforate region provided in at least one nozzle wall, thereby generating a fluid dynamic restriction which initiates the formation of the fluid dynamic throat.

19 Claims, 14 Drawing Sheets

FLUID VECTORING NOZZLE

BACKGROUND

The invention relates to a fluid vectoring nozzle.

In particular it relates to a fluid vectoring nozzle in which, in operation, vectoring of fluid flow in the nozzle is achieved by selectively producing a fluid dynamic throat in the nozzle.

Control of the flow direction of fluid exiting a pipe, duct or nozzle is known as a means of controlling the direction of travel of air, land and water based vehicles. For example by vectoring thrust from the exhaust nozzle of an aircraft the direction of the aircraft can be affected, thereby making the aircraft more maneuverable. In a land based vehicle (for example, in a hovercraft) vectored thrust can be used to the same effect to replace rudders or where the vehicle is slow moving and hence a conventional rudder is of limited use. Water based vehicles may also control their direction by controlling the direction of fluid exiting a water propulsion device, thereby steering the craft.

Such devices work by controlling a portion of the nozzle at nozzle exit. Hence whatever direction the nozzle exit points in is the direction the fluid will travel in, thereby causing a reaction force that steers the vehicle.

Alternatively a moveable grille, vent or vane assembly arrangement may be provided at nozzle exit, which, by setting the vanes at an angle to the axis of the nozzle, alters the direction of fluid flow exiting the nozzle.

Such devices require the use of moveable mechanical parts to be placed in the nozzle fluid flow. The reliability of the moveable parts is clearly critical since directional control of the associated vehicle depends on their operation. Any device in the fluid flow path of an exhaust nozzle of a gas turbine or water propulsion device will have to cope with foreign object damage, dirt and debris affecting pivotable bearing joints, as well as withstanding the physical force induced by the thrust of the fluid. Hence such devices must either be made robust enough to last long hours or be capable of being easily maintained or replaced. In both cases the maintenance cost of such a device will be high, and the design and construction will be complex in order to deliver a reliable product. Additionally, the provision of a moveable grille, vent or vane assembly will also introduce turbulence into the exhausted fluid, thereby contributing the amount of noise produced by the exhausted fluid.

Flow vectoring devices employing fluid injection are also known. These operate by injecting fluid at an angle to the direction of the bulk fluid flow through a nozzle. The injected fluid creates a fluidic obstruction or ramp which deflects the bulk fluid flow towards the opposing duct wall thereby altering its direction of travel. Such devices are disadvantaged in high aspect ratio nozzles (i.e. a wide but shallow duct) where it is required to vector the fluid flow from left to right. In such an embodiment the fluid injection would need to be through the side of the duct, and the obstruction/ramp effect is diminished by the width of the nozzle, requiring a large mass flow of fluid to be injected to obtain a minor vectoring effect.

Hence a device which can control the directional flow of fluid at exit from a nozzle and yet not require moveable parts to be placed in the fluid flow passing through the nozzle, which can reduce operational noise levels of the engine, and which enables effective flow vectoring in nozzles in which other flow vectoring devices have reduced effectiveness, is highly desirable.

SUMMARY

According to the present invention there is provided a fluid vectoring nozzle comprising flow vectoring means suitable for selectively producing a fluid dynamic throat in the nozzle in a plane oblique to the axis of the nozzle, such that in operation fluid flow passing through the throat is rotated about an axis parallel to and coincident with the plane of the throat. That is to say the invention is a means by which the direction of fluid flow through the nozzle can be controlled by forming a fluid dynamic throat in the nozzle at an angle to the axis of the nozzle, hence causing fluid passing through the fluid dynamic throat to be turned towards an angle perpendicular to the plane of the throat. The present invention requires no moving parts to be placed in the fluid stream, and hence the present invention will not suffer the same mechanical disadvantages and noise generation problems of prior solutions which utilizes physical structures to vector flow. Additionally the present invention will more reliably and efficiently vector fluid flow in high aspect ratio nozzles than previously known flow vectoring devices which utilize fluid injection.

Preferably the flow vectoring means is operative to selectively inject a control fluid into the nozzle. Control fluid is injected into the nozzle at a sufficient mass flow rate to cause a fluid obstruction sufficient to cause a fluid dynamic throat to form, but at a low enough mass flow rate such that the bulk fluid flow through the nozzle is not significantly deflected by the obstruction/ramp formed and the fluid does not penetrate the whole distance across the nozzle. Fluid injection has the advantage over using a solid object to obstruct the gas flow as the fluid injection can be enabled and disabled without the need for moveable solid objects in the gas flow. Injecting fluid into the exhaust gas flow path of a gas turbine engine, for example, also has the advantage of cooling the exhaust air, thereby reducing exhaust exit temperatures. This will extend the life of the nozzle wall by reducing running temperatures.

Preferably flow vectoring means comprises fluid injection means arranged to inject the control fluid into the nozzle through a perforate region provided in at least one nozzle wall. The perforate region allows for the passage of control fluid through the nozzle wall. Additionally the perforate region defines the position at which the fluid dynamic throat will be formed, and hence the location at which fluid vectoring of the fluid will occur. The control fluid is injected through the nozzle wall either perpendicular to or at an angle to the wall surface such that it is injected with a vector component directed upstream.

Preferably the fluid injection means includes an external fluid source and the perforate region includes at least one aperture formed in the at least one nozzle wall through which control fluid is injected. The at least one aperture can be any shape suitable for the purpose of allowing the passage of fluid such as, by way of non limiting example, a single round hole or a slot extending across the width of the nozzle.

Preferably the perforate region includes a plurality of apertures disposed across at the least one wall of the nozzle in a line oblique to the axis of the nozzle. The line of apertures defines the position of the throat, and hence the angle through which fluid passing through the nozzle will be turned.

Preferably the fluid injection means is adapted to inject control fluid through at least part of the perforate region to effect control of the angle of the vectored fluid flow.

Preferably the perforate region comprises porous material. That is to say, the perforate region includes material containing voids, pores, cells, interstices, or other such openings, at least some of which interconnect to form a flow path through the material.

Preferably the porous material extends across at least one wall of the nozzle in a line oblique to the axis of the nozzle. The fluid dynamic throat is formed along the same line as the porous material and extends away perpendicular to the nozzle wall through which the fluid is provided. Hence the line of porous material defines the angle through which, in operation, fluid passing through the throat is turned.

Preferably the fluid injection means is translatable across the apertured region of the at least one nozzle wall. Such a configuration has the advantage that the fluid dynamic throat can be produced at a plurality of different angles to the nozzle axis, thereby increasing the range of angles the fluid exiting flow path can be turned through.

Preferably the control fluid is a different fluid to fluid flowing through the nozzle.

Preferably the flow vectoring means comprises fluid oscillator means. That is to say, the means for selectively producing a fluid dynamic throat in the nozzle in a plane oblique to the axis of the nozzle may comprise a device which when energized oscillates fluid adjacent to the inside of the nozzle wall in which the fluid oscillator means is mounted and causes a fluid flow restriction, thereby initiating a fluid dynamic throat.

Preferably the flow vectoring means are located towards the nozzle exit. Placing the device at nozzle exit ensures the flow path of fluid passing through the throat is not affected by the nozzle walls downstream of the throat position, thereby maximizing the effectiveness of the fluid vectoring nozzle.

Preferably the cross-sectional flow area of the nozzle increases upstream and downstream of the flow vectoring means. Such a geometry aids in reliably generating the fluid dynamic throat in a consistent location.

Preferably the cross-sectional flow area of a region of the nozzle upstream and downstream of the flow vectoring means is substantially constant, and the cross-sectional flow area of the nozzle increases upstream and downstream of said region. Such a geometry aids in reliably generating the fluid dynamic throat in a consistent location.

Preferably the flow vectoring means further comprises a ridged plateau section provided on the nozzle wall, the cross-sectional flow area of the nozzle increases upstream and downstream of the said ridged plateau section. Such a geometry aids in reliably generating the fluid dynamic throat in a predictable location.

Preferably the nozzle has a substantially polygonal cross section.

Preferably the nozzle has an aspect ratio of greater than about 2. The generation of a fluid dynamic throat by the means of the present invention is more reliable and effective with such a nozzle (i.e. a "high aspect ratio" nozzle), with fluid dynamic throat being initiated from a fluid injection or fluid oscillator means provided along the long side of the nozzle wall. Aspect ratio may refer to a polygonal shaped duct (e.g. a rectangle) or a duct having an elliptical cross-section.

Preferably at least one vane is located towards the nozzle exit such that the nozzle is divided into at least two channels in the region where the flow vectoring means is provided. This provides the advantage that a fluid dynamic throat can be initiated from either side or both sides of a nozzle at different angles to the axis of the nozzle. Hence fluid flow exiting from either channel could be directed in different directions at the same, or different, times.

For a better understanding of the present invention and to show more clearly how it may be carried into effect, reference will now be made, by way of example, to the accompanying drawings, in which:

DETAILED DESCRIPTION

Figure 1A:
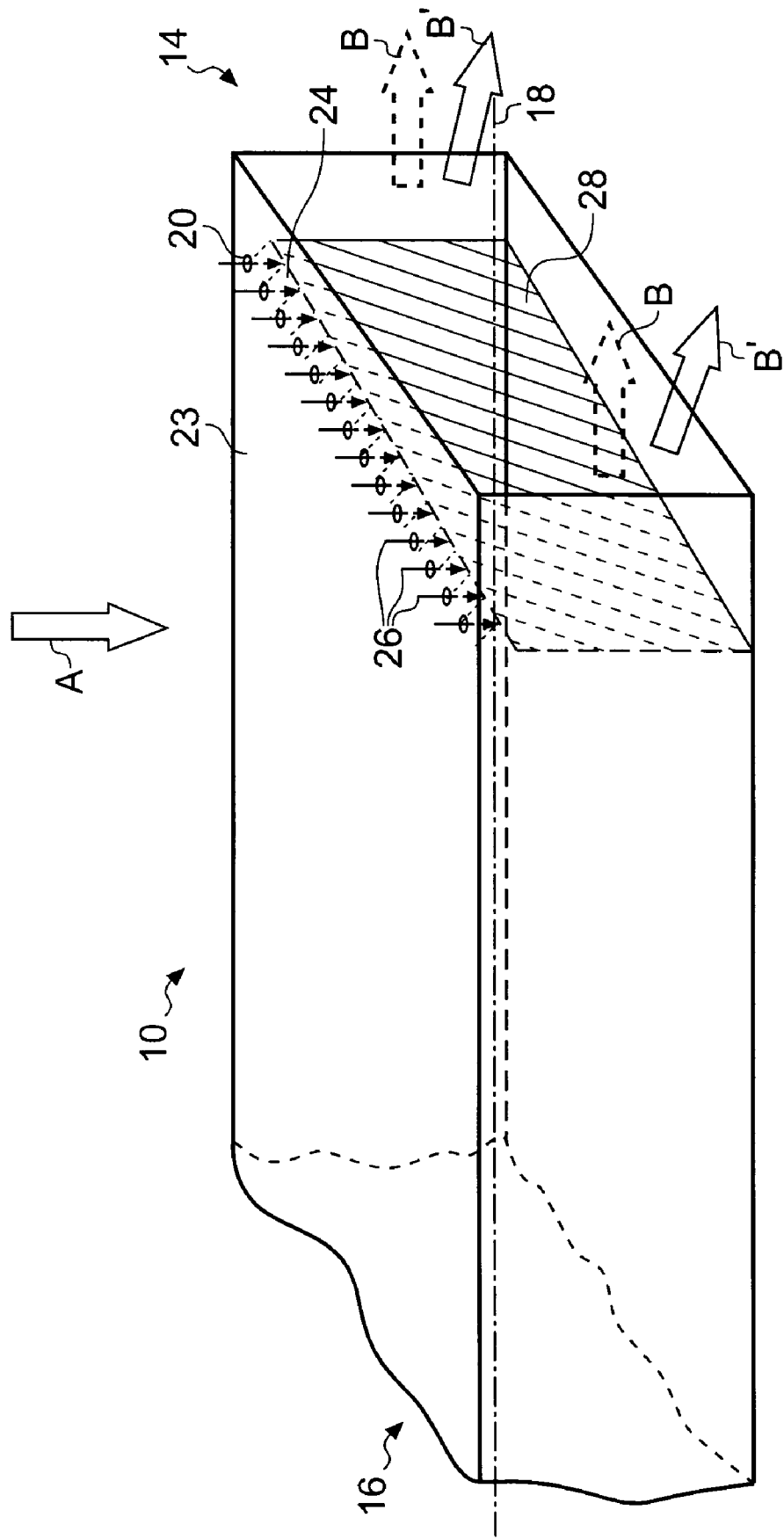
FIG. 1A shows a perspective view of an end section of a nozzle which comprises part of first embodiment of a fluid control device according to the present invention.
Figure 1B:
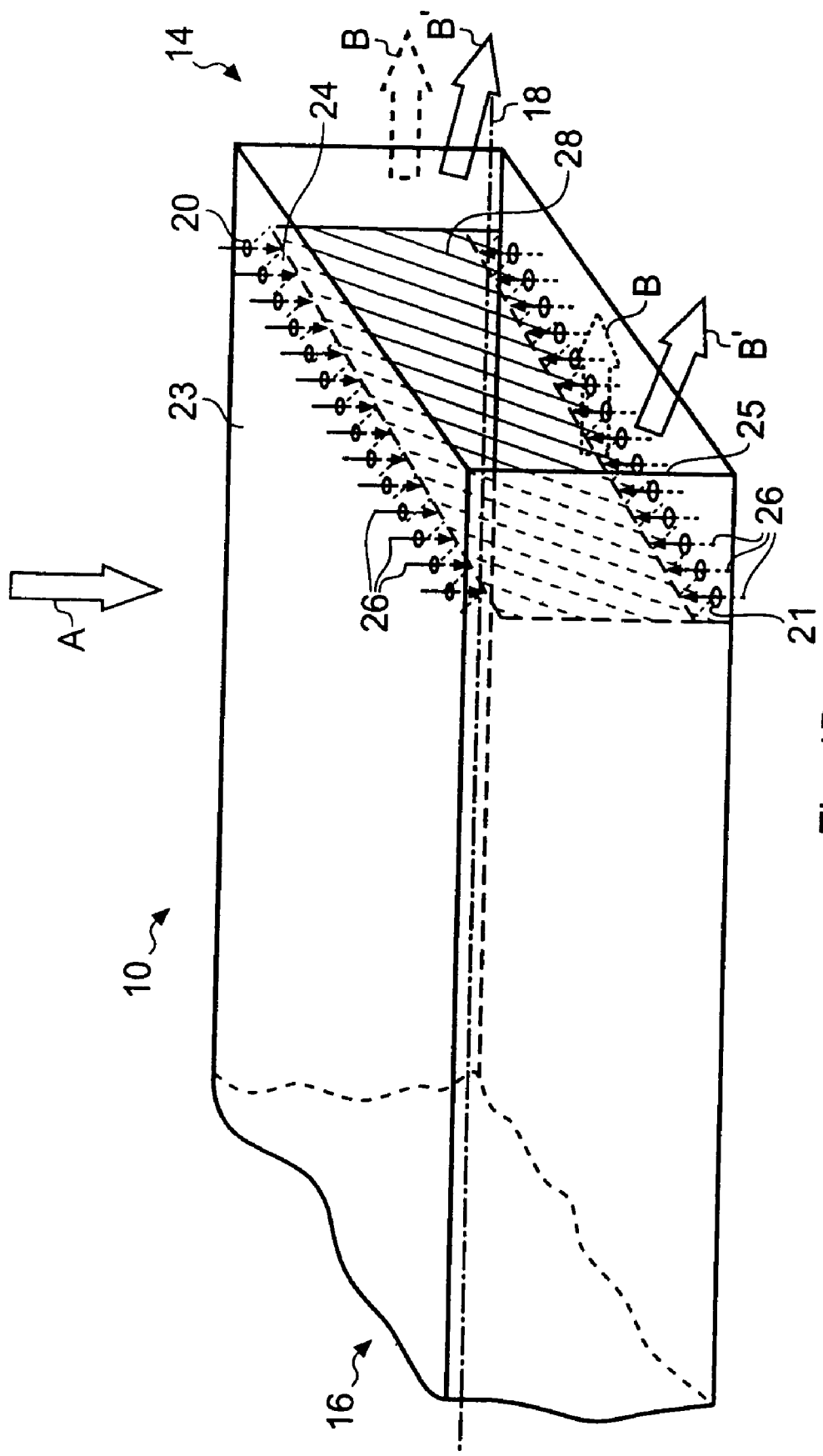
FIG. 1B shows a perspective view of an end section of a nozzle as shown in FIG. 1A, but provided with additional flow vectoring means.
Figure 1C:
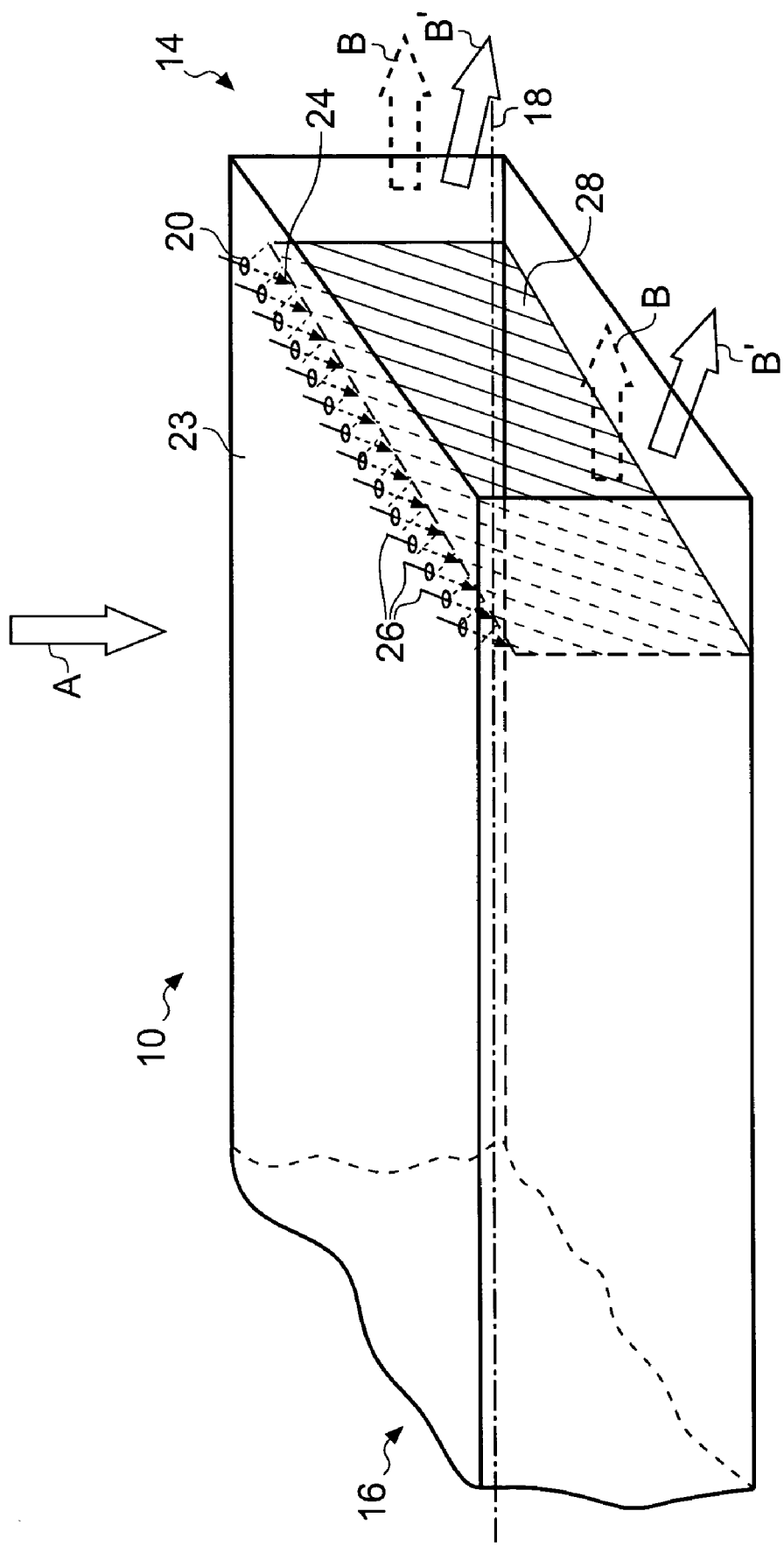
FIG. 1C shows a perspective view of an end section of a nozzle as shown in FIG. 1A, but provided with fluid injection means which direct control fluid upstream from the point of injection.
Figure 2:
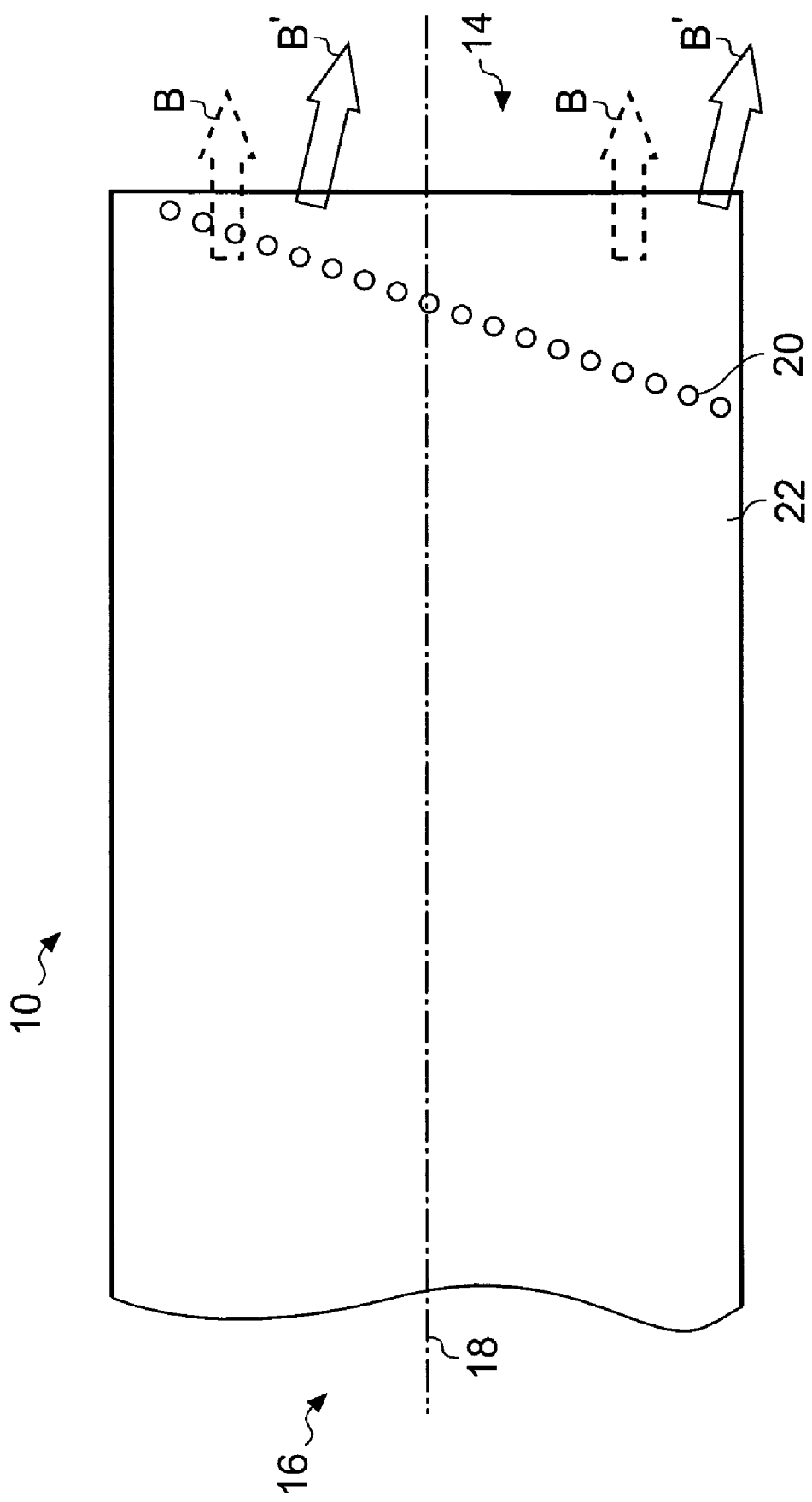
FIG. 2 shows a plan view of the nozzle viewed from direction "A" as shown in FIG. 1A, FIG. 1B and FIG. 1C.

Shown in FIG. 1A, FIG. 1B, FIG. 1C and FIG. 2 is an end section of a fluid vectoring nozzle 10 according to the present invention. FIGS. 1A and 1B show a perspective view and FIG. 2 shows a plan view as seen from a direction indicated by arrow "A" in FIG. 1. In these embodiments the nozzle 10 has an exit section 14 and a nozzle inlet 16 (not shown). The nozzle 10 is substantially of rectangular cross section with a high aspect ratio; that is to say the width of the nozzle 10 is substantially larger than the height of the nozzle 10 and has a longitudinal axis 18 which extends from nozzle inlet 16 to nozzle exit 14. Flow vectoring means are provided and comprise a means for injecting fluid into the nozzle 10 suitable for selectively producing a fluid dynamic throat. The fluid injection means comprises a perforate region 20, provided as a row of apertures 20, substantially at nozzle exit 14 along a line oblique to the nozzle axis 18, as shown in FIG. 1A. Alternatively, and as shown in FIG. 1B, a second row of apertures 21 are provided on the opposite nozzle wall such that the orifice row 20 is substantially opposite the orifice row 21, both at nozzle exit 14 and both along a line oblique to the nozzle axis 18. Although control fluid injection is shown as being perpendicular to the direction of the bulk fluid flow, the control fluid may be injected an angle to the perpendicular (as shown in FIG. 1C) such that the fluid injection vector has a component in the upstream direction.

The fluid injection means further comprises a controllable fluid supply means 22 (not shown). This may be of any appropriate and conventional device capable of delivering fluid on demand to the orifices 20 and is not shown in FIG. 1A, 1B, 1C or 2 to avoid obscuring the view of the nozzle 10 and orifices 20,21. The precise means by which fluid is delivered to the orifices 20 in operation is not central to an understanding nor the working of the invention. Sufficient to say that the fluid supply means 22 (not shown) comprises a pressurized fluid source which may be either a controllable supply linked to a compressor, a pressurized canister or some such other external fluid source. An outer duct may be present around the nozzle exit 14 which acts as a plenum feeding all of the orifices 20. Alternatively the orifices may be individually supplied or supplied by a fluid injector provided on a nozzle external surface 23 in the region which the orifices 20,21 have been formed.

In operation fluid is delivered to the nozzle inlet 16 and passes along the nozzle 10 towards the nozzle exit 14 and, unless otherwise affected, will exit the nozzle in a direction parallel to the axis 18 as indicated by arrow B.

To operate the fluid vectoring nozzle 10, a control fluid 26 is injected into the nozzle 10 via the orifices 20 and/or 21 at a sufficient mass flow rate to form a fluid dynamic restriction 24 and/or 25 respectively. The fluid dynamic restriction 24,25 is formed against the inside of the nozzle wall through which the fluid is injected. This in turn initiates the formation of a fluid dynamic throat 28, the plane of which extends across the nozzle 10 at substantially the same angle as the line of orifices 20. Fluid passing along the nozzle 10 is bent towards a plane perpendicular to the throat 28, and hence fluid exhausted from the nozzle exit 14 flows at an angle to the axis 18 as shown by arrow B'. That is to say the bulk fluid flow passing along the nozzle 10 through the throat 28 is rotated about an axis parallel to and coincident with the plane of the throat.

Figure 3:
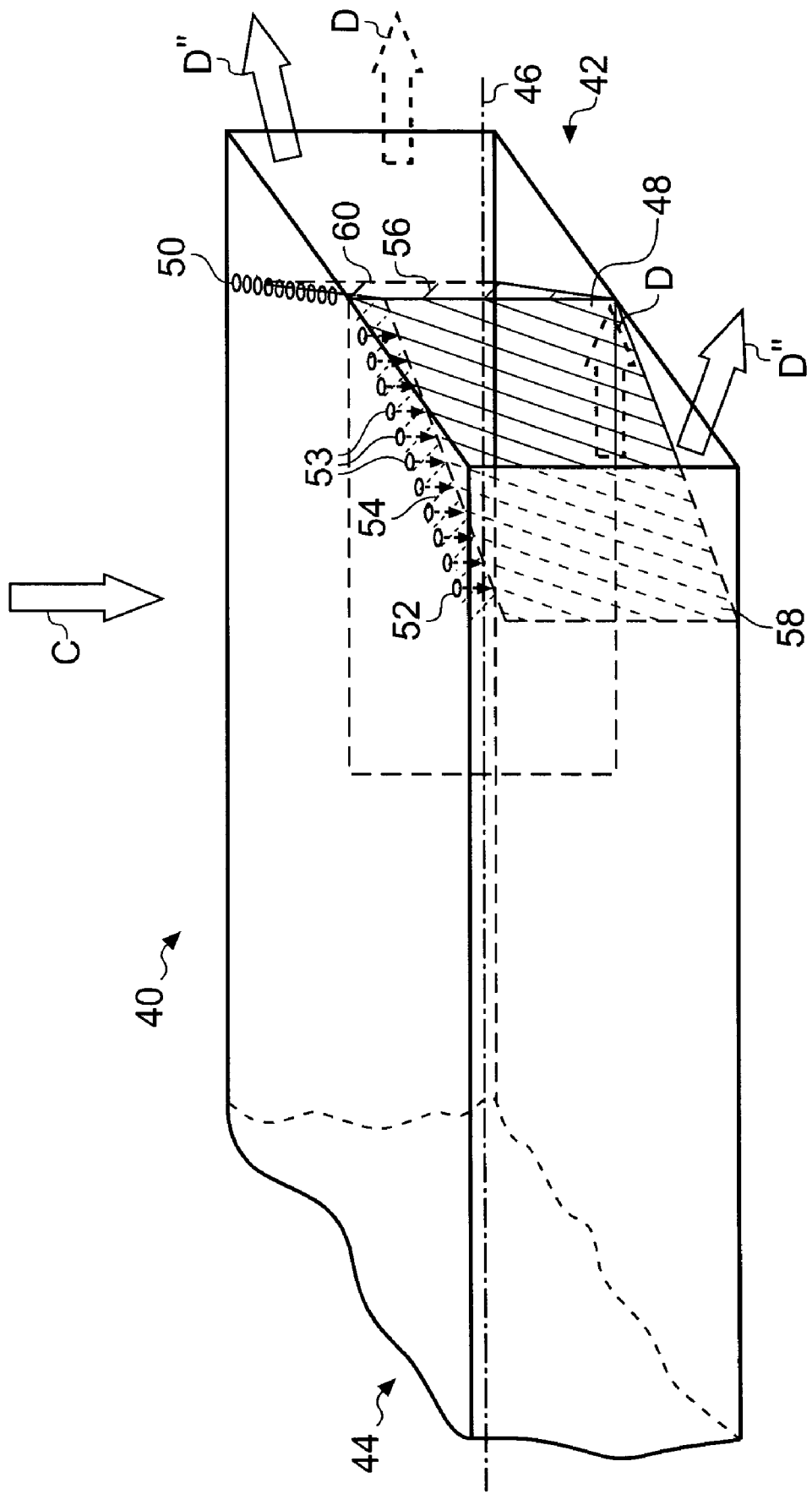
FIG. 3 shows a perspective view of an end section of a nozzle which comprises part of a second embodiment of a fluid control device according to the present invention.
Figure 4:
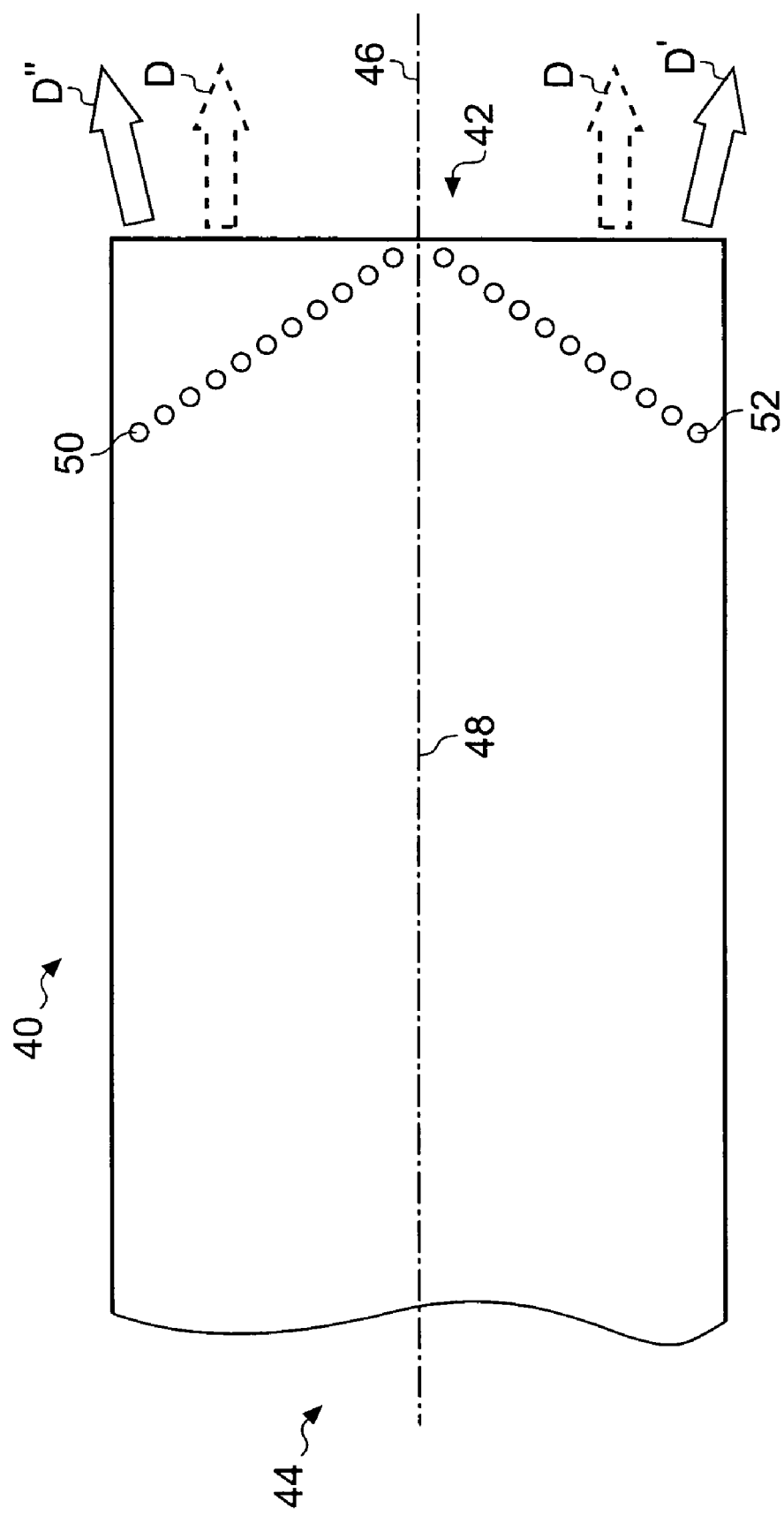
FIG. 4 shows a plan view of the nozzle viewed from direction "C" as shown in FIG. 3.

An alternative embodiment of the present invention is shown in perspective view in FIG. 3 and plan view as seen from the direction of arrow "C" in FIG. 4. In this embodiment a nozzle 40 has an exit section 42 downstream of a nozzle inlet 44 (not shown). The nozzle 40 is substantially of rectangular cross-section with a high aspect ratio, that is to say the width of the nozzle 40 is substantially larger than the height of the nozzle 40, and has a longitudinal axis 46 which extends from nozzle inlet 44 to nozzle exit 42.

A vane 48 is provided substantially mid way across the nozzle 40 and aligned with the nozzle axis 46 such as to divide the flow area into two at nozzle exit 42. An apertured region comprising two lines of orifices 50,52 is provided oblique to the axis 46 of the nozzle 40, one each extending from the mid point of the nozzle at nozzle exit 42; that is to say, from the position where the vane 48 meets the nozzle wall.

In operation fluid is delivered to the nozzle inlet 44 and passes along the nozzle 40 towards the nozzle exit 42, where the flow is split into two by the vane 48, and exits the nozzle 40 in a direction parallel to the axis 46 as indicated by arrow D.

The flow vectoring means injects control fluid 53 into the orifices 50 and/or orifices 52 at a sufficient mass flow rate to form fluid dynamic restrictions 54,56 respectively against the inside of the nozzle wall through which the control fluid 53 is injected. Each of the fluid dynamic restrictions 54,56 initiate the formation of a fluid dynamic throat 58,60 on their respective side of the vane 48.

Fluid passing along the nozzle 40 is bent towards a plane perpendicular to the fluid dynamic throat 58,60 it passes through the throat 58,60, and hence fluid exhausted from the nozzle exit 42 at an angle to the axis 46 as shown by arrows D' and D''. That is to say the bulk fluid flow passing along the nozzle 40 through the throat 58,60 is rotated about an axis parallel to and coincident with the plane of the throat 58,60. Control fluid 53 can be supplied to both sets of orifices 50,52 at the same time, thereby vectoring the flow in two directions D' and D'' at nozzle exit, or can be supplied to only one set of orifices 50,52 at a time such that flow is exhausted from the nozzle 40 in direction D and D' or direction D and D''.

Figure 5:
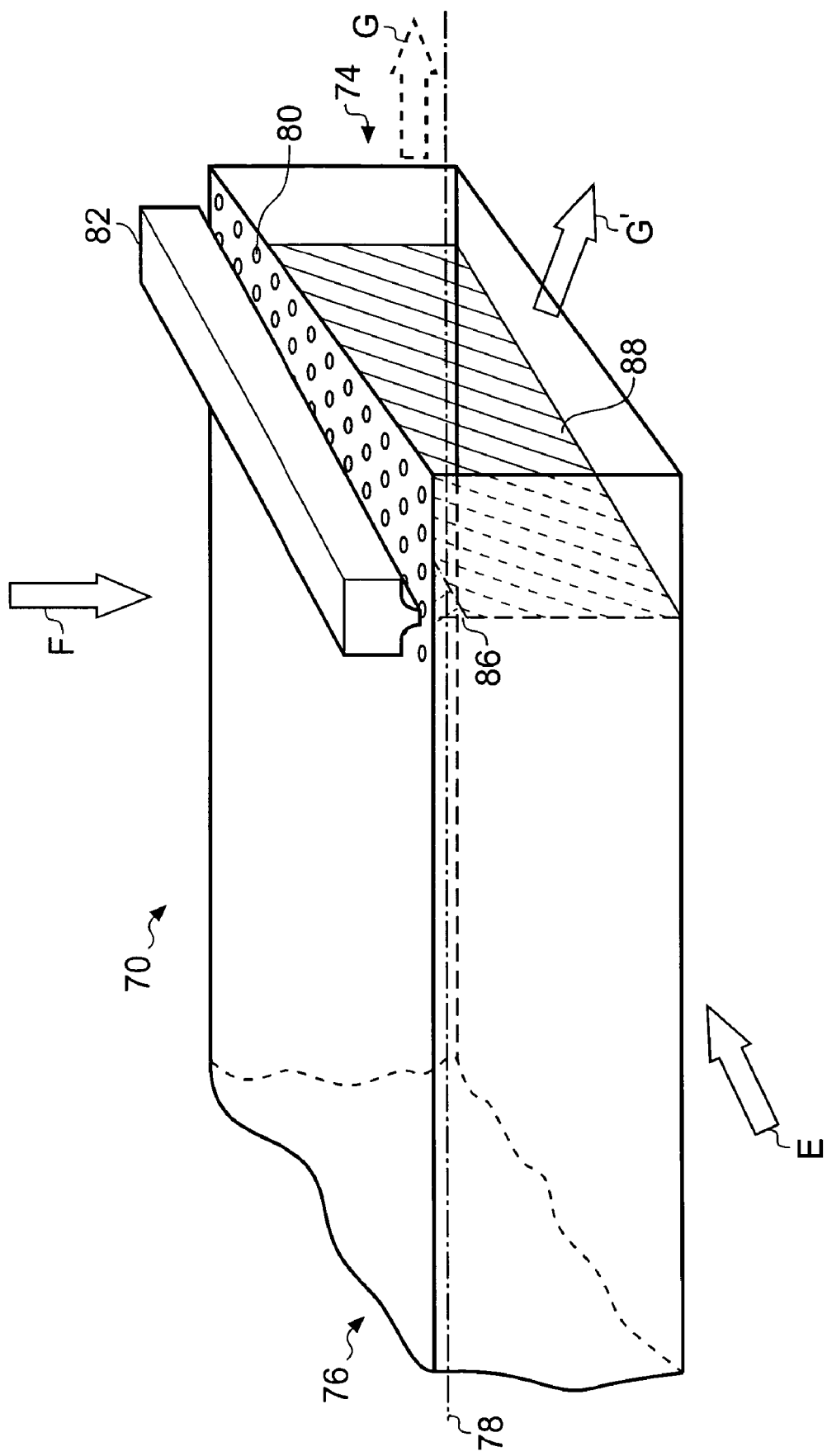
FIG. 5 shows a perspective view of an end section of a nozzle and a fluid injection means which comprise part of a third embodiment of a fluid control device.
Figure 6:
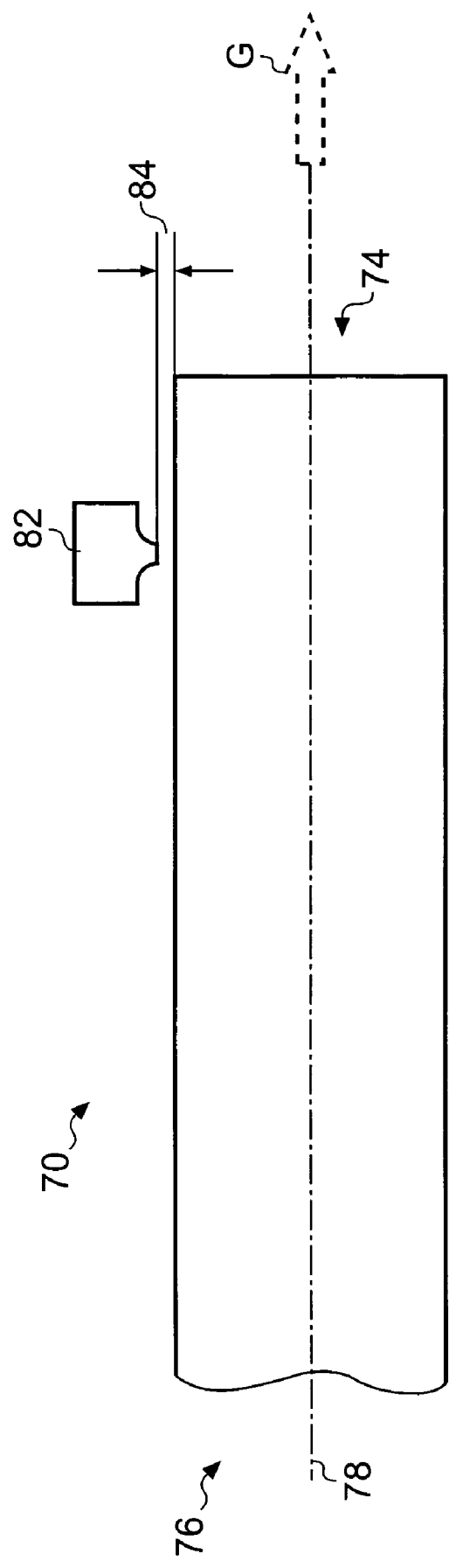
FIG. 6 shows a side view of the nozzle and fluid injection device as viewed from direction "E" in FIG. 5.
Figure 7:
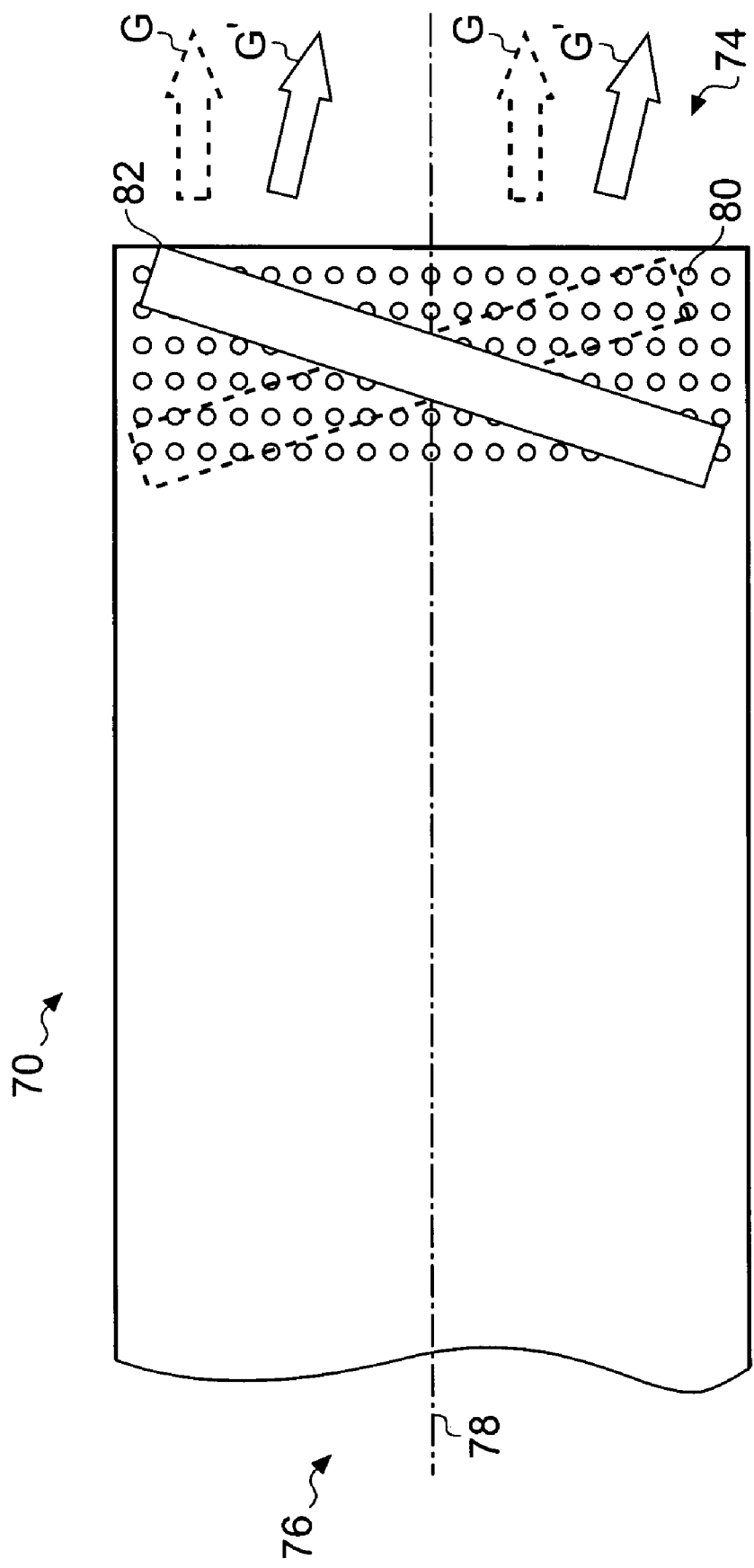
FIG. 7 shows a plan view of the nozzle and fluid injection device as viewed from direction "F" in FIG. 5.

An alternative embodiment of the present invention is shown in perspective view in FIG. 5, in side view in FIG. 6 as shown from a direction as indicated by arrow E and a plan view in FIG. 7 as seen from a direction as indicated by arrow F. In this embodiment a fluid vectoring nozzle 70 comprises an exit section 74 downstream of a nozzle inlet 76 (not shown). The nozzle 70 is substantially of rectangular cross section with a high aspect ratio; and has a longitudinal axis 78.

A plurality of orifices 80 are provided in one of the nozzle walls thereby forming an perforate region 80 which extends upstream from the nozzle exit 74.

A fluid injector 82 spans the width of the nozzle 70 and is pivotally mounted above the perforations by a small clearance 84 such that the fluid injector is translatable over the outside surface of the nozzle 70. The means by which the fluid injector 82 is pivotally mounted and its orientation controlled relative to the axis 78 may be by any suitable method, the details of which are not central to the working of the invention. The fluid injector 82 is connected to a source of pressurized fluid.

In operation fluid is delivered to the nozzle inlet 76 and passes along the nozzle 70 towards nozzle exit 74, and is exhausted in a direction parallel to the axis 78 as indicated by arrow G.

To enable fluid vectoring the fluid injector 82 is orientated to a desired angle relative to the axis 78 and ejects control fluid (not shown). Control fluid passes from the injector 82 through the orifices 80 and is supplied at a sufficient mass flow rate to form a fluid dynamic restriction 86, which initiates a fluid dynamic throat 88 that extends across the height of the nozzle 70. Hence control fluid will be injected through only part of the perforate region 80 at any one time.

Fluid passing along the nozzle 70 is bent towards a plane perpendicular to the fluid dynamic throat 88 as it passes through the said throat 88 and hence fluid exhausted from the nozzle exit 74 is at an angle to the axis 78 as shown by arrow G'. That is to say the bulk fluid flow passing along the nozzle 70 through the throat 88 is rotated about an axis parallel to and coincident with the plane of the throat 88.

The fluid injector 82 can be pivoted to any angle relative to the axis 78. One position, by way of non limiting example, is shown in FIG. 7 in solid line, and another is shown as a dotted line. In this way the fluid injection means 82 is configurable to inject control fluid through at least part of the apertured region 80 to effect control of the angle of the vectored fluid flow. Hence fluid may be vectored such that it can exit the nozzle 70 in any one of a number of directions.

The degree to which fluid flowing through nozzles 10,40, 70 is turned towards a plane perpendicular to the fluid dynamic throat is, to some extent, proportional to the mass flow of air passing through the orifices 20,50,52,80. Hence the vectoring effect is greatest with a relatively large mass flow of air and less with a relatively small mass flow of air.

Figure 8:
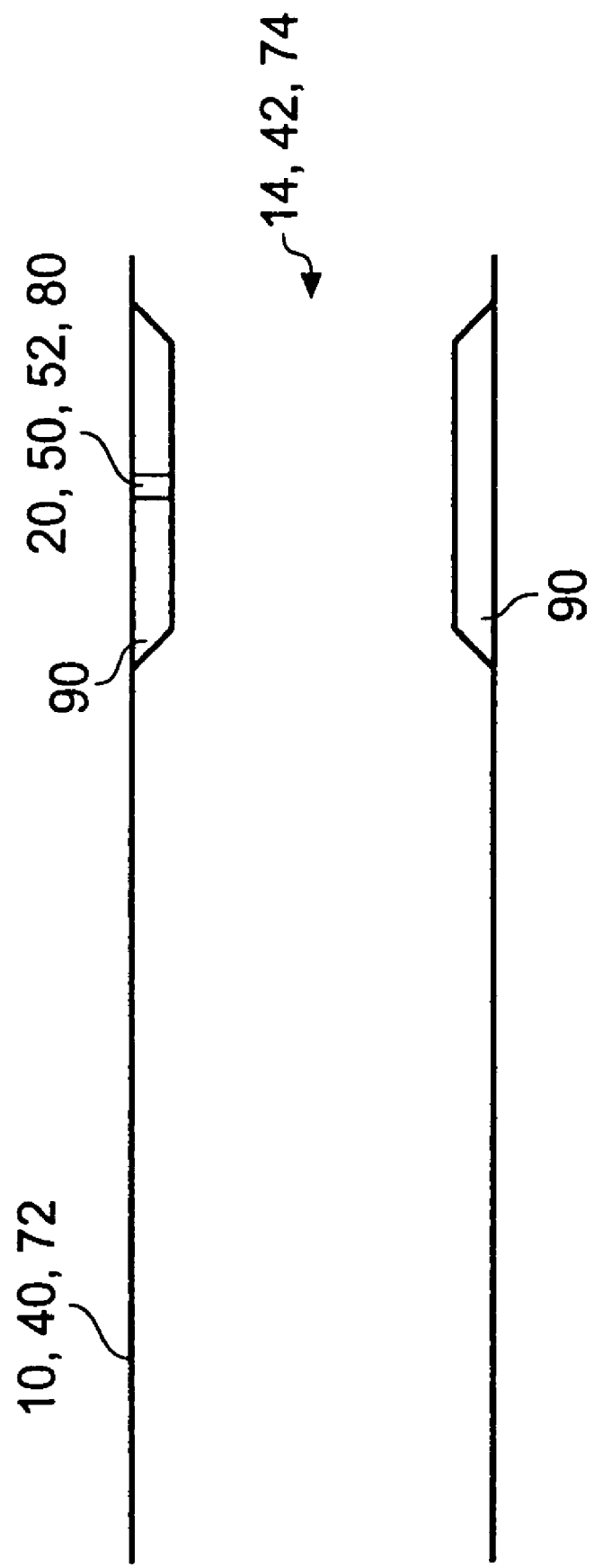
FIG. 8 shows a sectional view of an end section of a nozzle fitted with a flat plateau section according to the present invention.

Shown in FIG. 8 is a sectional view of an end section 14,42,74 of a nozzle according to the present invention in which is provided a flat plateau section 90. Such a plateau 90 could be fitted to any of the nozzles 10,40,70 previously described. The plateau 90 spans the width of the nozzle 10,40, 70 and is ramped up at either end to form a flat section. Hence the cross sectional flow area of the nozzle is reduced by the plateau, and the cross sectional flow area of the nozzle increases upstream and downstream of the plateau 90. The plateau 90 is provided on nozzle wall or two opposite facing nozzle walls as shown in FIG. 8. Orifices 20,50,52,80 as per the embodiments of FIGS. 1 to 7 extend through plateau 90 at least one of the plateaus 90.

The operational effect of the plateau 90 is to produce a region of the nozzle 10,40,70 which has a narrowed cross sectional flow area and hence promotes conditions for the creation of a fluid dynamic throat when a control fluid is injected through orifices 20,21,50,52,80.

Figure 9:
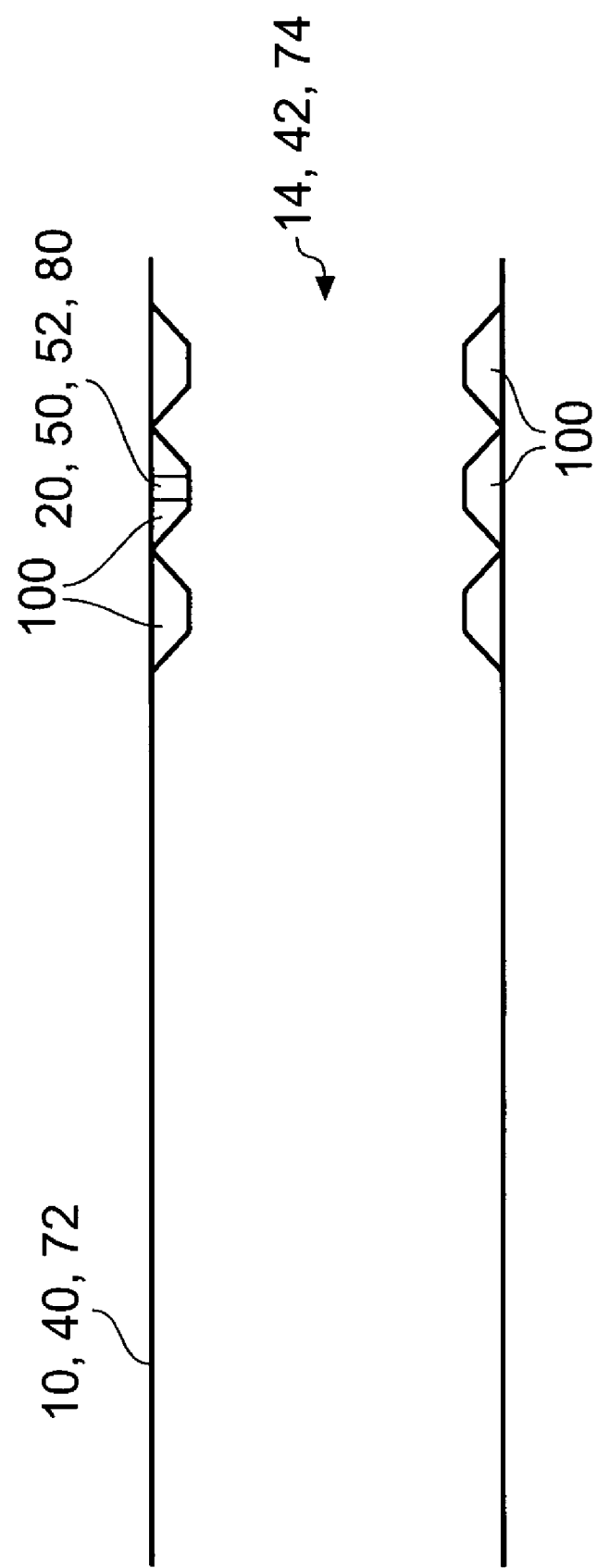
FIG. 9 shows a sectional view of an end section of a nozzle fitted with a ridged plateau section according to the present invention.

The plateau may alternatively take the form of a sequence of ridged plateaus 100 as shown in FIG. 9, which promote the same effect as the flat plateau 90 of FIG. 8.

The plateaus of FIGS. 8 and 9 are shown as additional structures provided on the nozzle walls, but could alternatively be produced by "necking" or narrowing the nozzle to produce a similar geometry, thereby producing a region of the nozzle having a reduced cross sectional flow area.

Figure 10:
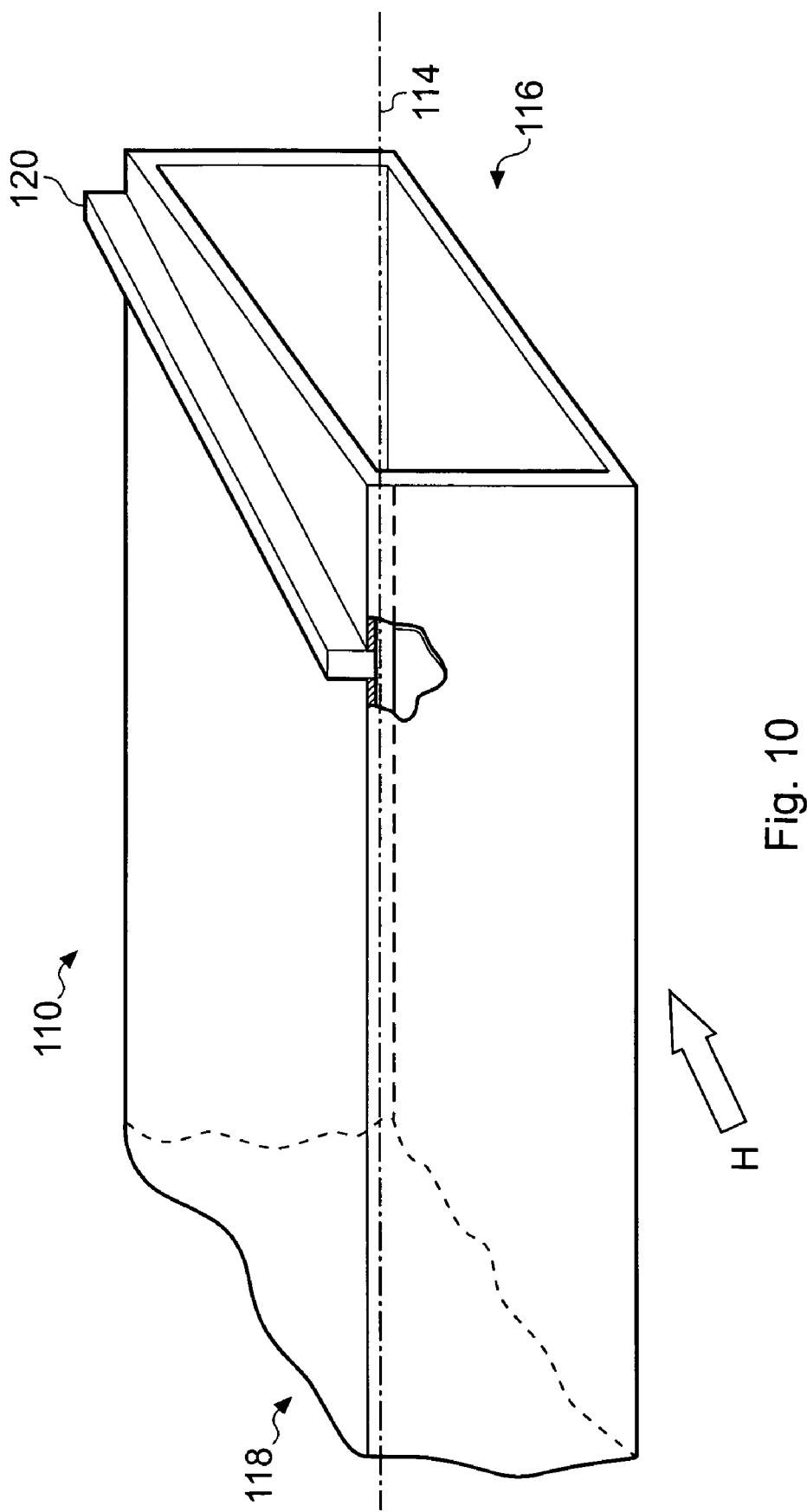
FIG. 10 shows a perspective view of an end section of a nozzle fitted with a fluid oscillator means according to the present invention.
Figure 11:
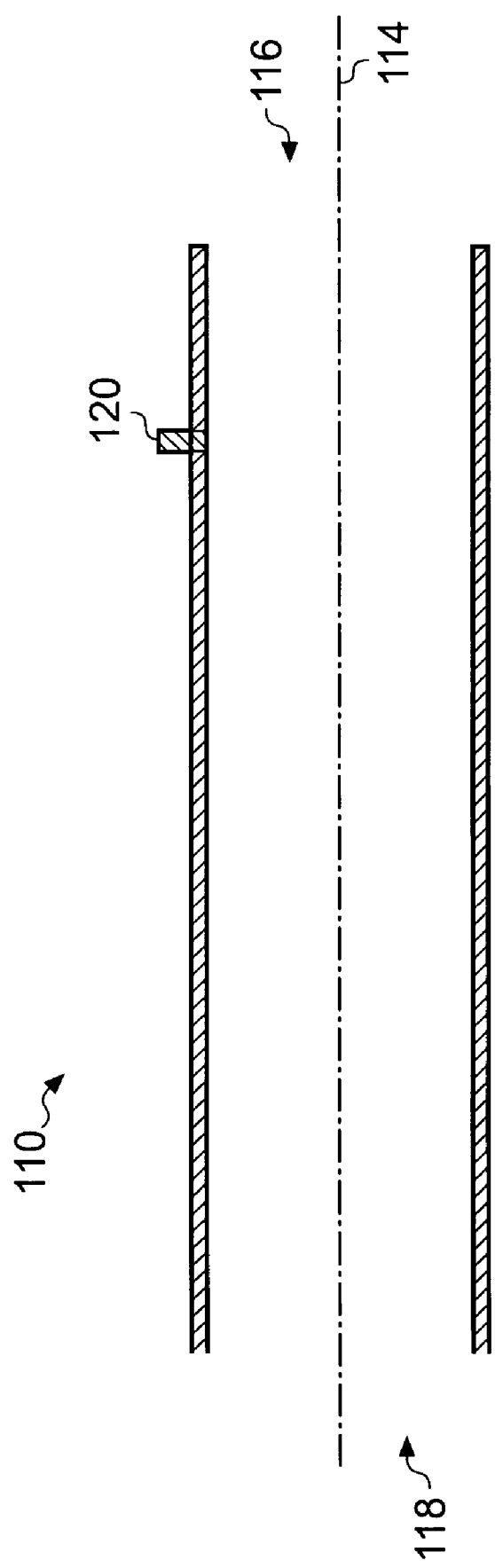
FIG. 11 shows a cross-sectional side view of the nozzle as viewed from a direction indicated by arrow "H" as shown in FIG. 10.

Another alternative embodiment is presented in FIG. 10 in perspective view, and in sectional view in FIG. 11 as seen from a direction indicated by arrow "H". These figures show a fluid vectoring nozzle 110 with a longitudinal axis 114 and a nozzle exit 116 downstream of a nozzle inlet 118 (not shown).

A fluid oscillator means 120 is provided on a wall of the nozzle 110, spanning the width of the nozzle 110 and set oblique to the axis 114. An understanding of the precise nature of the fluid oscillator means 120 and its mode of operation is not central to understanding the operation the present invention and so will be not be described here.

In operation the fluid oscillator means 120 is energized and, by oscillating fluid adjacent to the inside of the nozzle wall in which the fluid oscillator means 120 is mounted, causes a fluid flow restriction and thereby initiates a fluid dynamic throat, the effect and use of which is as described for the preceding embodiments.

Figure 12:
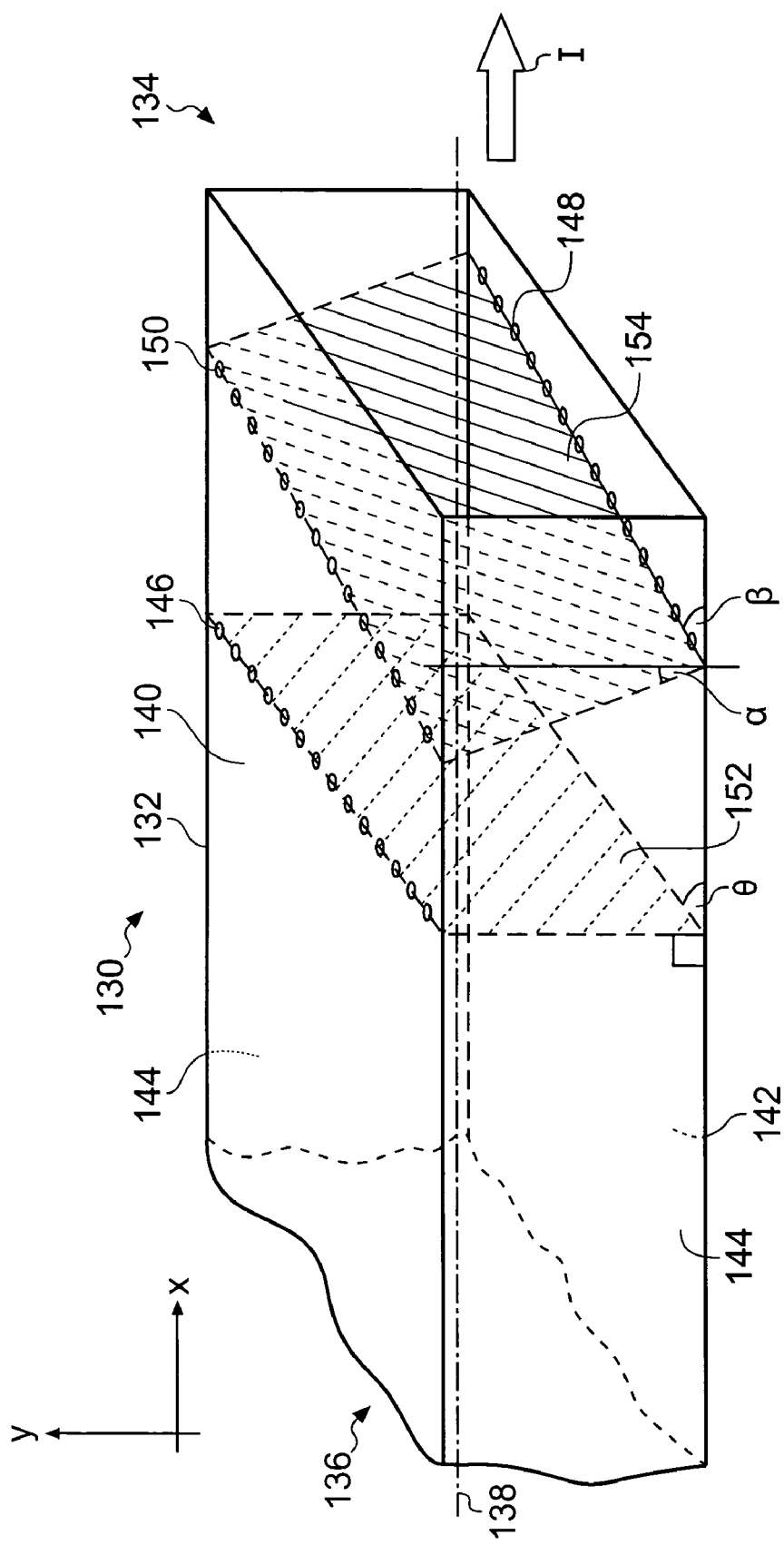
FIG. 12 shows a perspective view of an end section of a nozzle fitted with pitch and yaw vectoring means according to the present invention.

Presented in FIG. 12 is another embodiment of the present invention; a fluid vectoring nozzle 130 comprising a nozzle exit 134, nozzle inlet 136 and longitudinal axis 138 as per the previous embodiments. The nozzle is substantially rectangular in cross-section with a high aspect ratio; that is to say the height of nozzle 130 is less than its width. The upper wall 140 and lower wall 142 define the width and the side walls 144 define the height.

A row of orifices 146 is provided on the upper wall 140 oblique to the axis 138, (at an angle θ). Downstream, a row of orifices 150 is provided on the upper wall 140 oblique to the longitudinal direction of the axis 138, (at an angle β) and, further downstream, a further row of orifices 148 is provided on the lower wall 142 also oblique to the longitudinal direction of the axis 138, (at an angle β). Hence row of orifices 148 are positioned further downstream than the corresponding row of orifices 150.

In operation, fluid is delivered to the nozzle inlet 136 and passes along the nozzle 130 towards the nozzle exit 134 and is exhausted in a direction parallel to the axis 78 as indicated by arrow "I". To vector the bulk fluid flow, a control fluid (not shown) is injected through orifices 146 to form a fluid dynamic throat 152 that will turn the bulk fluid in a direction towards the plane perpendicular to the plane of the throat 152. That is to say the bulk fluid flow passing along the nozzle 130 through the throat 152 is rotated about an axis parallel to and coincident with the plane of the throat 152.

Control fluid may also be injected through orifices 148,150 to generate a fluid dynamic throat 154 which is tilted at an angle α to the "y" (height) direction as well as being tilted at an angle β in the "x" (longitudinal) direction.

Hence in such a configuration fluid passing through throat 152 will be turned in one dimension (i.e. "right" in the example shown in FIG. 12) or, when the throat 154 is present will be turned in a first direction (i.e. "right" in the example shown in FIG. 12) and in a second direction ("up" in the example shown in FIG. 12). Hence a greater degree of control of the fluid direction at nozzle exit 134 is obtained with such a configuration.

The source of the control fluid employed to form the flow restriction and hence the fluid dynamic throat as described in the preceding examples may be a source of compressed fluid, redirected fluid from upstream of the fluid injection point or some other appropriate external fluid source.

As well as orifices, apertures or holes the fluid injection means in the nozzle wall may be provided as a region of porous material through which fluid can pass. In this application porous is taken to mean a material containing voids, pores, cells, interstices, or other such openings, at least some of which interconnect to form a flow path through the material. As with the perforate regions described herein, the porous material extends across at least one wall of the nozzle in a line oblique to the axis of the nozzle to define a line along which the fluid dynamic throat will be formed. In embodiments analogous to that shown in FIGS. 5, 6 and 7 where the fluid injection means is translatable across the perforate region and the perforate region extends upstream from the nozzle exit 74, the porous region may also extend over an area extending from the nozzle exit rather than being restricted to a discrete line.

Although flow vectoring means suitable for selectively producing a fluid dynamic throat in the nozzle in a plane oblique to the axis of the nozzle have been shown in FIGS. 1A, 1C, 3, 4, 5, 6, 7, 8, 9 10, 11 as being provided on only one nozzle wall, a second flow vectoring means may also be provided in all of the above and like embodiments on a nozzle wall substantially opposite the first (as shown, for example, in FIG. 1B). In embodiments where the flow vectoring means is a fluid injection means, rows of orifices substantially opposite one another on the nozzle walls (as shown in FIG. 1B) are advantageous since the mass flow rate of the control fluid entering the nozzle via the orifices need not be as great to achieve a fluid dynamic restriction and hence initiate a fluid dynamic throat. Likewise, provision of fluid oscillator means on opposite facing nozzle walls is also advantageous since each fluid oscillator need only produce a relatively small fluid restriction in order to generate a sufficient fluid dynamic restriction to initiate a fluid dynamic throat.

The control fluid injected via the flow injection means can be either the same as, or different to, the bulk fluid flow.

The aspect ratio of the nozzle is preferably greater than about 2. In the embodiments presented above utilizing fluid injection means, the nozzle must have a high aspect ratio in order for the formation of a fluid restriction to initiate a fluid dynamic throat. The lower the aspect ratio, the higher the required mass flow through the orifices, and hence the less efficient the fluid vectoring nozzle.

The present invention is found to have beneficial use in the directional control of aircraft when fitted to an exhaust nozzle of a gas turbine engine, and the directional control of water based vehicles propelled by water jets.

The invention claimed is:

1. A fluid vectoring nozzle comprises walls defining a fixed geometry cross section with a longitudinal axis that lies perpendicular to a plane of the cross section, the fixed geometry cross section defining a width and a height such that the width is greater than the height, and flow vectoring means suitable for selectively producing a fluid dynamic restriction that extends from at least one of the walls defining the width of the nozzle in a line along the wall and oblique to the longitudinal axis of the nozzle, thereby initiating a fluid dynamic throat in the nozzle in a plane oblique to the longitudinal axis of the nozzle, such that in operation the fluid dynamic throat directs fluid towards a plane perpendicular to the plane of the fluid dynamic throat by turning fluid flow passing through the throat about an axis parallel to the plane of the throat.

2. A fluid vectoring nozzle as claimed in claim 1 wherein the flow vectoring means is operative to selectively inject a control fluid into the nozzle.

3. A fluid vectoring nozzle as claimed in claim 1 wherein the flow vectoring means comprises fluid injection means arranged to inject the control fluid into the nozzle through a perforate region provided in at least one nozzle wall.

4. A fluid vectoring nozzle as claimed in claim 3 wherein the perforate region includes at least one aperture formed in the at least one nozzle wall through which control fluid is injected.

5. A fluid vectoring nozzle as claimed claim 3 wherein the fluid injection means includes an external fluid source.

6. A fluid vectoring nozzle as claimed in claim 3 wherein the perforate region includes a plurality of apertures disposed across at the least one wall of the nozzle in a line oblique to the axis of the nozzle.

7. A fluid vectoring nozzle as claimed in claim 3 wherein the fluid injection means is adapted to inject control fluid through at least part of the perforate region to effect control of the angle of the vectored fluid flow.

8. A fluid vectoring nozzle as claimed in claim 3 wherein the perforate region comprises porous material.

9. A fluid vectoring nozzle as claimed in claim 8 wherein the porous material extends across at least one wall of the nozzle in a line oblique to the axis of the nozzle.

10. A fluid vectoring nozzle as claimed in claim 3 wherein the fluid injection means is translatable across the perforate region.

11. A fluid vectoring nozzle as claimed claim 3 wherein, in operation, the control fluid is a different fluid to fluid flowing through the nozzle.

12. A fluid vectoring nozzle as claimed in claim 1 wherein the flow vectoring means comprises fluid oscillator means.

13. A fluid vectoring nozzle as claimed in claim 1 wherein the flow vectoring means are located towards the nozzle exit.

14. A fluid vectoring nozzle as claimed in claim 1 wherein a cross-sectional flow area of the nozzle increases upstream and downstream of the flow vectoring means.

15. A fluid vectoring nozzle as claimed in claim 14 wherein the cross-sectional flow area of a region of the nozzle upstream and downstream of the flow vectoring means is substantially constant, and the cross-sectional flow area of the nozzle increases upstream and downstream of said region.

16. A fluid vectoring nozzle as claimed in claim 14 wherein the flow vectoring means further comprises a ridged plateau section provided on the nozzle wall, the cross-sectional flow area of the nozzle increases upstream and downstream of the said ridged plateau section.

17. A fluid vectoring nozzle as claimed in claim 1 wherein the nozzle has an aspect ratio of greater than about 2.

18. A fluid vectoring nozzle as claimed in claim 1 wherein at least one vane is located towards the nozzle exit such that the nozzle is divided into at least two channels in the region where the flow vectoring means is provided.

19. A fluid vectoring nozzle as claimed in claim 1 wherein the nozzle is an exhaust nozzle for a gas turbine engine.

* * * * *